E. GESSNER.

Machine for Pressing Cloth.

No. 9,076. Reissued Feb. 17, 1880.

WITNESSES:

W. W. Hollingsworth

Edw. A. Byrn.

INVENTOR:

Ernst Gessner

BY

Munn & Co.

ATTORNEYS.

E. GESSNER.

Machine for Pressing Cloth.

No. 9,076. Reissued Feb. 17, 1880.

WITNESSES:

W. W. Hollingsworth

Edw. U. Byrn.

INVENTOR:

Ernst Gessner

BY

ATTORNEYS.

UNITED STATES PATENT OFFICE.

ERNST GESSNER, OF AUE, SAXONY, GERMANY.

MACHINE FOR PRESSING CLOTH.

SPECIFICATION forming part of Reissued Letters Patent No. 9,076, dated February 17, 1880.

Original No. 206,718, dated August 6, 1878. Application for Reissue filed December 11, 1879.

DIVISION A.

*To all whom it may concern:*

Be it known that I, ERNST GESSNER, of Aue, in the Kingdom of Saxony, Empire of Germany, have invented a new and useful Improvement in Machines for Pressing Cloth; and I do hereby declare that the following is a full, clear, and exact description of the same.

This invention relates to improved machinery for hot-pressing and finishing woven, felted, and other fabrics.

The invention is an improvement upon that general form of machine in which a hollow steam-heated press-box smooths and presses the cloth between its curved inner surface and the periphery of an adjacent cylinder.

The improvement consists in combining with a single cylinder a pair of diametrically-arranged press-boxes and a curved press plate or guide connecting said press-boxes, which press plate or guide secures the uniform and smooth passage of the cloth from one press-box to the other, and which arrangement of press-boxes gives a repeated pressure on the same side of the cloth and causes the great strain of one press-box to neutralize that of the other, so as to relieve the bearings of the cylinder.

The improvement consists, further, in combining with the press-box and cylinder a press plate or guide made of sheet metal, attached upon one side to a press-box, and passing nearly around the periphery of the cylinder in close proximity thereto, and attached at its other edge to a shaft made axially adjustable to roll up and regulate the pressure or degree of constriction of the said curved press plate or guide around the cylinder.

The invention also consists in the combination, with a pair of cylinders, of two oppositely-placed press-boxes and an intermediately-placed double press-box, together with curved sheet-metal press plates or guides.

The invention also further consists in the combination, with the cylinders and press-boxes, of vertical arms pivoted at their bottoms and carrying the press-boxes at the top, together with means for drawing together the arms and adjusting the pressure of the boxes, as hereinafter fully described.

Figure 1:
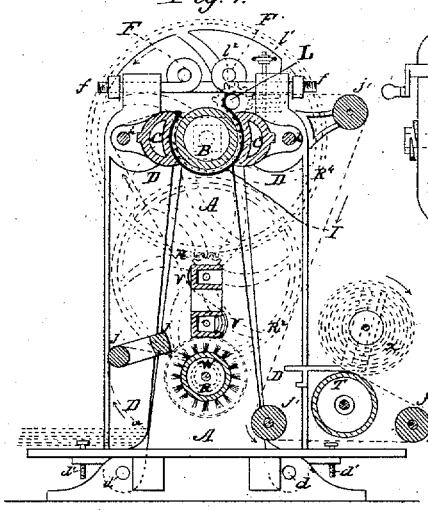
Figure 2:
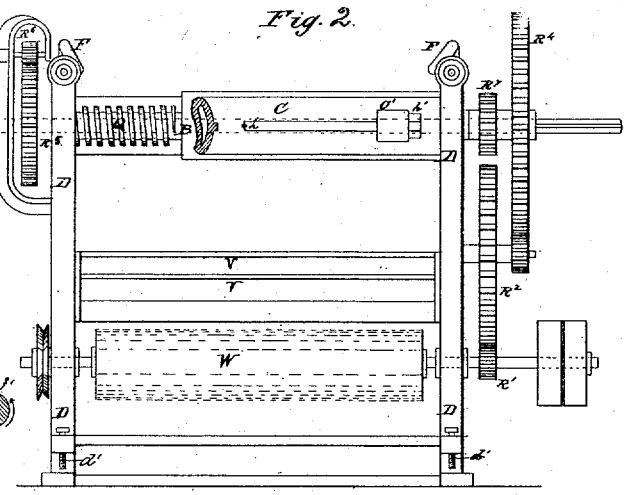
Figure 3:
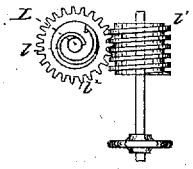
Figure 4:
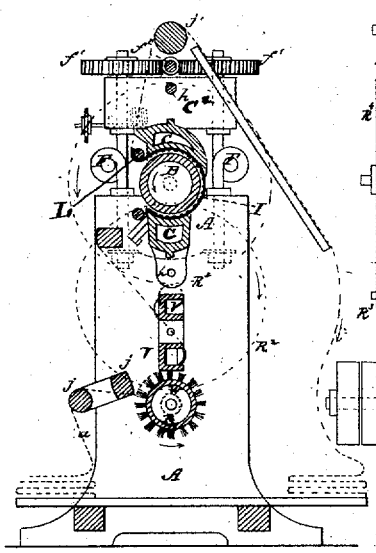
Figure 7:
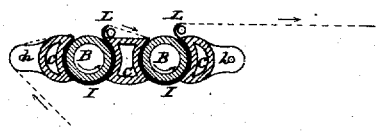
Figure 8:
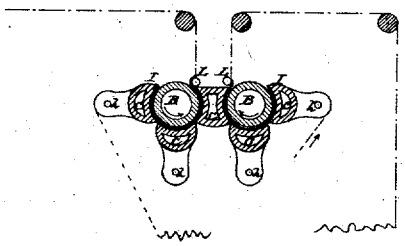

Figure 1 represents a vertical section; Fig. 2, a front elevation, partly in section, of a machine having a single cylinder and two pressing-boxes, one on either side, and a sheet-metal pressing plate or guide encircling the cylinder; and Fig. 3 shows a detail thereof. Fig. 4 is a vertical section, and Fig. 5 a front elevation, of a machine with a single cylinder, a sheet-metal pressing plate or guide, as before, and two pressing-boxes, one above and one below the cylinder. Fig. 6 represents a vertical section of a machine with a single cylinder and pressing-box and a sheet-metal plate or guide encircling the cylinder. Fig. 7 shows a cross-section of a machine with two cylinders on the same horizontal plane, with a double pressing-box between them acting on both, and single pressing-boxes at either side, connected to the intermediate double pressing-box by sheet-iron plates or guides encircling the cylinders, this arrangement being adapted for applying a repeated and extra-powerful pressure on one or on both sides of the fabric, which thus receives a better luster; Fig. 8, the cross-section of a similar machine with the addition of pressing-boxes beneath the cylinders, this arrangement being intended for pressing two pieces of goods at once.

Referring to Figs. 1 and 2, A represents standards supporting bearings in which the journals of the pressing cylinder or cylinders B are mounted. C are the pressing-boxes, which, at either side of the cylinder or cylinders, are carried by pairs of arms D, movable on pivots *d* at their lower ends, and adjusted horizontally by means of screws *d'*. The boxes C are made to press by means of weights, springs, hydraulic or other power, acting directly or through levers or otherwise. In these figures the arms D are connected by strong springs F, whose tension is regulated by nuts *f*.

Figure 5:
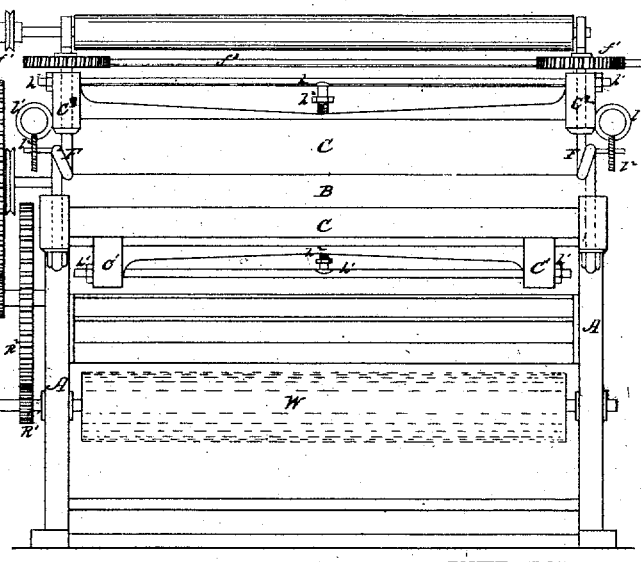
Figure 6:
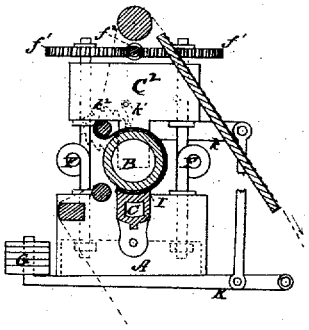

In Figs. 4, 5, and 6, however, where the line of pressure is vertical, the press boxes and cylinder are brought together by four springs, F, connecting the standards A with cross-heads $C^2$. To make the adjustment of these springs uniform, nuts upon the top of said springs are connected with worm-wheels $f'$, which latter are simultaneously turned an equal extent by worms $f^2$ on a horizontal shaft. This adjustment here described I claim as a part of Division B of this reissue.

The pressing cylinder or cylinders B may either be of cast-iron and hollow, and either heated or cold, or be made solid and of pasteboard when the pressure is equal on both sides. If of metal, the surface is preferably covered with felt. The pressing-boxes C are curved to correspond to the cylinder against which they are applied. They are here shown hollow and made of cast-iron, and are ordinarily heated by steam.

One of the boxes (that with which the fabric is last in contact) is cooled with cold water or otherwise, according to the effect required. For woolen fabrics it is found most suitable to heat the first box and cool the last of the series, so that the fabric is thus cooled under pressure. The boxes may also be heated by means of gas, petroleum, or other combustible.

In order to prevent the boxes from bending outward at the center they are trussed by rods $h$, secured by nuts $h'$ in lugs C', formed on the backs of the boxes in Fig. 2, and secured in cross-heads $C^2$ in Fig. 5, whereby sufficient tension is maintained to keep the boxes up to their work, $h^2$, Fig. 5, being a screw for regulating the tension to suit any degree of pressure.

To prevent the fabric from being damaged during its passage between the pressing-cylinder B and the boxes C, and to guide the cloth smoothly from one box to the other, a thin sheet of metal, I, which I term a "press" plate or guide, is applied between the surfaces of the boxes and the fabric. This sheet of metal is attached on one side to the one box, C, and on the other to the tension-shaft L, acted on by a coiled spring, $l$, at each end, regulated by a worm and wheel, $l'$ $l^2$, as shown in Fig. 3. The sheet of metal may also be kept in tension by any other suitable means.

In Fig. 6 a weighted lever, K, is caused to act on shaft L through a rod jointed to lever $k$, pawl $k'$, and ratchet $k^2$, secured on shaft L.

The machine shown in the latter figure has a single cylinder and pressing-box, and is intended for use when but slight pressure is required. In this case the shaft L is made of larger diameter, and also serves as a support for the cylinder B against the pressure of the box C, the sheet metal I inclosing the cylinder and fabric.

The pressing-cylinder in all cases receives motion from the driving-shaft W by gear wheels and pinions $R'$ $R^2$ $R^3$ $R^4$, and the second cylinder (shown in Figs. 7 and 8) is driven from the first one by gears of equal diameter, or otherwise. The driving-shaft W may also carry a brush-cylinder, as shown in Figs. 1, 2, 4, and 5.

The fabric to be pressed is first folded and placed upon the bottom board, (see Figs. 1 and 4,) and is then led upward, as indicated by the dotted lines $a$, over the guide $j$, brush-cylinder W, and cross-bars V, over one of the pressing-boxes C, then around the cylinder B, thence over the guide-rollers $j'$ down to the bottom board, on which it is again folded, as in Fig. 4; or the fabric, on leaving guides $j'$, may be wound, as shown in Fig. 1, on a roller, $x$, rotated by contact with a drum, T, which is driven by the wheel $R^7$ on the cylinder B. The length of the fabric may at the same time be measured by suitable mechanism.

For pressing goods having selvages of different widths there is a depression made at one end of the cylinder B, and on the opposite face of the pressing-boxes C, corresponding to the thickness of selvage, and the cylinder B is capable of being adjusted in the direction of the width of the cloth, the shaft of said cylinder and journals of the pressing-boxes being made of sufficient length for the purpose.

The shaft of cylinder B has also a longitudinal keyway or groove at one end to receive a feather, by which it is enabled to be shifted in its bearings and in the gears $R^4$ and $R^7$, (see Fig. 2,) and still receive rotary motion in all positions. The shaft at the opposite end of the cylinder simply slides in its bearings.

The bearing Q is screw-threaded on its exterior to receive a nut, by which the position of the bearing is regulated through a toothed wheel, $R^5$, attached to the nut, the wheel being driven by a pinion, $R^6$, and winch-handle, (see Fig. 2;) or, instead of being screw-threaded, the bearing may have a rack upon it and be shifted by means of a pinion.

With respect to the duplicate arrangement of cylinders with diametrically-arranged press-boxes shown in Figs. 7 and 8, I would state that I do not claim in this case the double cylinders, except when combined with the press-plate and intermediate press-box, as I have claimed in Division B of this reissue a set of cylinders revolving together without an intermediate press-box in connection with press-boxes arranged at the remote sides of the cylinders.

I would also disclaim in this application the adjustment for the press-boxes shown in Figs. 4 and 6, for the same reason that I have covered this feature also in Division B.

Having thus described my invention, what I claim as new is—

1. The combination, with a single cylinder, of two diametrically-arranged press-boxes and a curved press plate or guide for continuing the passage of the cloth from one press-box to the other, substantially as described.

2. A cloth finishing and pressing machine consisting, essentially, of a revolving cylinder, a press-box, and a curved sheet-metal press plate or guide attached at one edge to the press-box and passing partially around the cylinder, and attached at its other edge to an axially-adjustable shaft, all combined substantially as described.

3. The combination, with a pair of cylinders, of two oppositely-placed press-boxes and an intermediate double press-box, together with the curved sheet-metal press plates or guides I, as and for the purpose described.

4. The combination, with the cylinder B, of the press-boxes C C, pivoted vertical arms D D, carrying said press-boxes, and means for connecting said arms and regulating the pressure of the boxes on the cylinder, substantially as described.

The above specification of my invention signed by me this 17th day of July, 1879.

ERNST GESSNER.

Witnesses:
ALFRED NOEZOLD,
FRANZ EBERT.